United States Patent [19]
Sakaguchi

[11] Patent Number: 5,264,976
[45] Date of Patent: Nov. 23, 1993

[54] RESILIENT SUPPORT FOR A DISK DRIVE PIN IN A ROTATING DISK DATA STORAGE APPARATUS

[75] Inventor: Takahiro Sakaguchi, Kodaira, Japan

[73] Assignee: Teac Corporation, Tokyo, Japan

[21] Appl. No.: 794,432

[22] Filed: Nov. 19, 1991

[30] Foreign Application Priority Data

Nov. 22, 1990 [JP] Japan .............................. 2-122795[U]
Nov. 22, 1990 [JP] Japan .............................. 2-122796[U]

[51] Int. Cl.$^5$ ............................................. G11B 5/016
[52] U.S. Cl. .................................................. 360/99.05
[58] Field of Search ........................... 360/99.05, 99.08

[56] References Cited

U.S. PATENT DOCUMENTS

| | | | |
|---|---|---|---|
| 4,445,157 | 4/1984 | Takahashi | 360/133 |
| 4,758,915 | 7/1988 | Sakaguchi | 360/97 |
| 4,855,850 | 8/1989 | Nagaoka | 360/99.05 |

FOREIGN PATENT DOCUMENTS 62-106347 7/1987 Japan .

*Primary Examiner*—A. J. Heinz
*Attorney, Agent, or Firm*—Woodcock Washburn Kurtz Mackiewicz & Norris

[57] ABSTRACT

A disk drive for use with a flexible magnetic disk having a sheet metal hub with a central hole and an eccentric slot formed therein. The disk drive has a turntable on which the disk is to be placed for joint rotation therewith. The turntable has a spindle disposed centrally for centering engagement in the central hole in the disk, and a drive pin disposed eccentrically on the turntable for driving engagement in the eccentric slot. Erected on the free end of a lever which is pivotally mounted to the turntable, the drive pin is biased to travel substantially radially outwardly of the turntable so that the disk may be engaged by the spindle and the drive pin without looseness. Since the data storage disk when first loaded on the turntable rests slantingly thereon, with the drive pin butting endwise against the disk, until the drive pin becomes engaged in the disk slot with the rotation of the turntable, the support lever is formed to include a constricted neck portion intermediate the opposite ends thereof. The neck portion is capable of torsional deflection to permit the drive pin to tilt radially inwardly of the turntable into right angular relationship with the data storage disk resting slantingly on the turntable, whereby the drive pin is smoothly admitted into the disk slot upon rotation of the turntable.

9 Claims, 7 Drawing Sheets

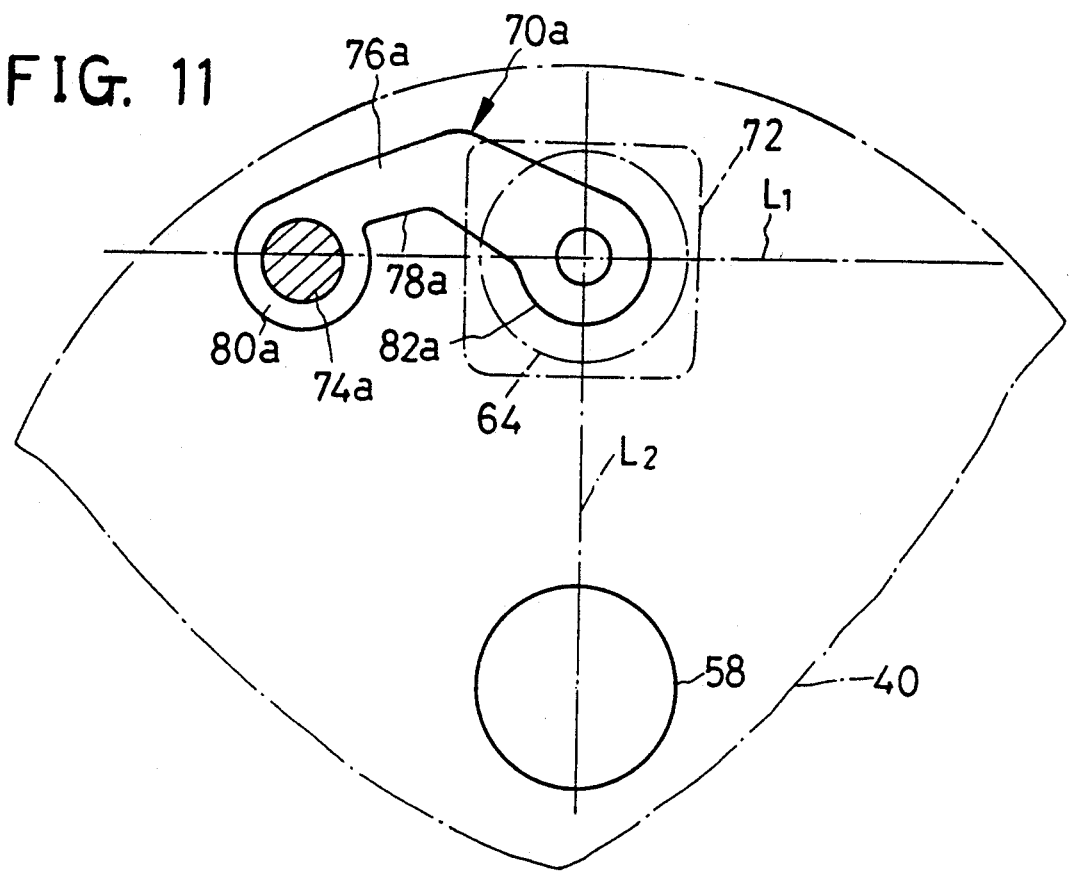
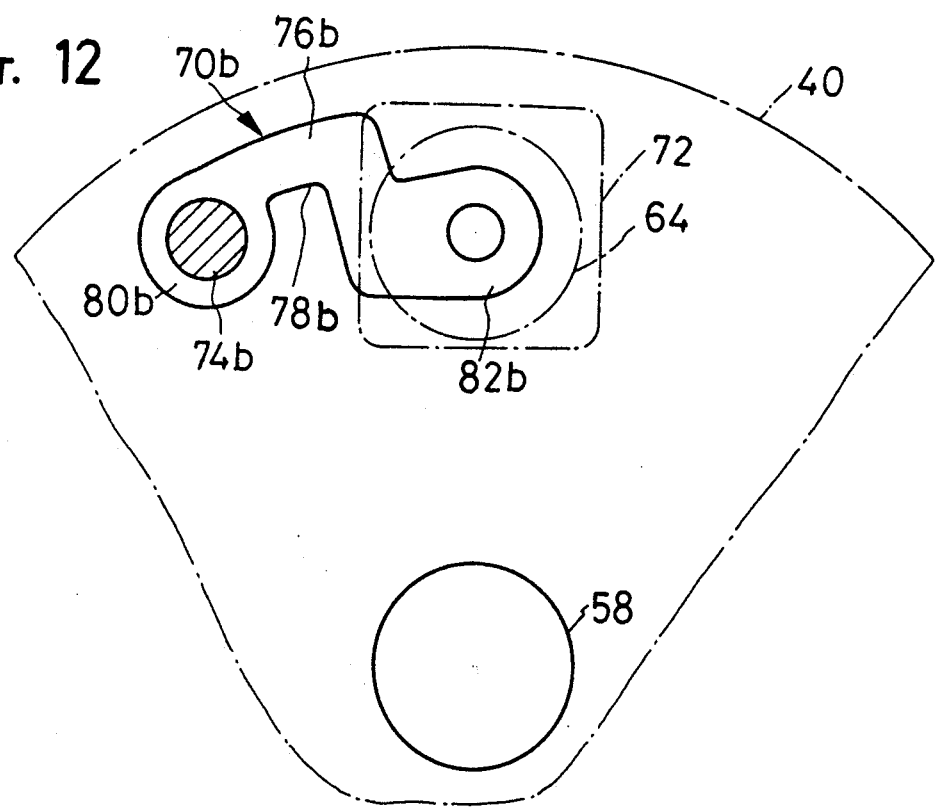

RESILIENT SUPPORT FOR A DISK DRIVE PIN IN A ROTATING DISK DATA STORAGE APPARATUS

BACKGROUND OF THE INVENTION

My invention relates to an apparatus for the transfer (reading and/or writing) of data with rotating data storage disks typically including a flexible magnetic disk. More particularly, my invention pertains to such a rotating disk data storage apparatus of the kind having a drive pin movably supported in an eccentric position on a turntable for driving engagement in a slot or opening in a metal made hub of the disk. Still more particularly, my invention deals with an improved support mechanism for the drive pin on the turntable.

The three and a half inch flexible magnetic disk is known (FIGS. 1 and 2) which has a sheet metal hub attached centrally thereto, as described and claimed by U.S. Pat. No. 4,445,157 to Takahashi. The hub has formed therein a central opening of square shape and an eccentric opening of rectangular shape. When loaded in the associated data storage apparatus, or disk drive according to common parlance, the disk has its central hub placed upon a turntable of much smaller diameter than that of the disk. The turntable has a permanent magnet for attracting the disk hub. Erected centrally on the turntable, a spindle engages in the central opening in the disk hub for centering the disk with respect to the turntable. Further a drive pin is disposed eccentrically on the turntable for driving engagement in the eccentric slot in the disk hub, imparting the rotation of the turntable to the disk.

I know two conventional approaches to the problem of how to support the eccentric drive pin on the turntable. One employs a cantilever spring support for the drive pin, as described and claimed by U.S. Pat. No. 4,758,915 to Sakaguchi, which is assigned to the assignee of the instant application. The other uses a spring biased lever, as disclosed in Japanese Unexamined Utility Model Publication No. 62-106347.

According to the cantilever spring approach, the drive pin is mounted directly on the spring for displacement both in an upstream direction of the turntable with respect to its predetermined direction of rotation and in a direction parallel to the axis of the turntable. The slanting attitude of the drive pin is intended to maintain the disk in correct angular relationship to the turntable, whereas the drive pin displacement in a direction parallel to the turntable axis is essential for the establishment of the driving engagement of the drive pin in the eccentric slot in the disk hub. Additionally, the drive pin support spring is designed to permit the drive pin to tilt toward the turntable axis for smooth insertion in the disk hub slot.

Although well calculated to accomplish the purposes for which it is designed, the drive pin support spring is very complex in shape and rather inconveniently large in size. It is, moreover, difficult to construct the spring so as to assure resilient displacement of the drive pin in the required directions to required degrees.

The spring biased lever approach, on the other hand, proposes to mount the drive pin on a support lever which is pivotally supported in an eccentric position on the underside of the turntable and which is biased radially outwardly of the turntable by a wire spring. The support lever itself can be of resilient sheet metal material to permit the displacement of the drive pin in a direction parallel to the axis of the turntable. Such resilient displacement of the drive pin in the two directions, made possible by this prior art device, is very effective for the establishment of the proper driving engagement of the turntable with the disk hub. Additionally, the support lever is far easier of fabrication than the noted drive pin support spring suggested by the Sakaguchi patent above.

I nevertheless object to this spring biased lever approach because, unlike the support spring discussed above, the drive pin support lever did not permit the drive pin to tilt toward the turntable axis, being incapable of torsional deflection. This inability of the drive pin to tilt toward the turntable axis brought about the following inconvenience:

When the flexible magnetic disk is first placed on the turntable, the spindle will infallibly enter the central hole in the disk hub. It is very unlikely, however, that the drive pin enter the eccentric slot in the disk hub immediately upon placement of the disk upon the turntable. Consequently, butting against the drive pin, the disk will rest slantingly on the turntable (FIG. 9). As the turntable is subsequently set into rotation, the drive pin will come into register with the eccentric slot in the disk hub before one complete revolution of the turntable and enter the slot if the drive pin has been tilted toward the turntable axis under the weight of the turntable (FIG. 10).

However, should the drive pin stay upstandingly against the weight of the disk, the edge of the eccentric slot might be caught by the drive pin. Then the drive pin would fail to enter the slot.

SUMMARY OF THE INVENTION

I have hereby invented how to assure smooth engagement of the drive pin in the eccentric opening in the disk hub in a drive pin support mechanism of the type employing a lever.

Briefly, my invention may be summarized as a rotating disk data storage apparatus having a turntable for supporting a data storage disk for joint rotation therewith, a spindle disposed centrally on the turntable for centering engagement in a first opening formed centrally in the disk, and a drive pin extending through an eccentric clearance hole in the turntable for driving engagement in a second opening formed eccentrically in the disk.

More specifically, my invention concerns an improved drive pin support mechanism in such a rotating disk data storage apparatus. The drive pin support mechanism comprises a support lever of resilient material carrying the drive pin on one end and coupled at another end to the turntable for pivotal movement relative to the turntable so that the drive pin is movable substantially radially of the turntable within limits set by the clearance hole in the turntable. The support lever generally extends circumferentially of the turntable for imparting the rotation of the turntable to the drive pin and thence to the data storage disk on the turntable. The drive pin support mechanism further comprises resilient means for biasing the drive pin substantially radially outwardly of the turntable in order that the data storage disk may be engaged without looseness by the spindle and the drive pin on the turntable.

As has been discussed in connection with the prior art, the data storage disk when first loaded concentrically on the turntable will rest slantingly thereon, with the drive pin butting endwise against the data storage disk, until the drive pin becomes engaged in the second opening in the disk with the rotation of the turntable. Therefore, according to my invention, the support lever is formed to include a constricted neck portion intermediate the opposite ends thereof. The neck portion is capable of torsional deflection to permit the drive pin to tilt radially inwardly of the turntable into right angular relationship with the data storage disk resting slantingly on the turntable. Thus, upon subsequent rotation of the turntable, the drive pin is smoothly admitted into the second opening in the disk.

The torsional deflection of the drive pin support lever according to my invention makes it undesirable to employ the conventional wire spring for biasing the drive pin radially outwardly of the turntable. I therefore suggest magnetic biasing of the drive pin. This can be accomplished by, for example, fabricating the drive pin support lever from magnetic sheet metal material and by employing a disk drive motor of known construction having a permanent magnet rotor of annular shape mounted concentrically to the turntable for joint rotation therewith. The drive pin can be magnetically biased radially outwardly of the turntable by positioning the support lever radially inwardly of the permanent magnet rotor, as the latter exerts an attractive force on the support lever.

The above and other features and advantages of my invention and the manner of realizing them will become more apparent, and the invention itself will best be understood, from a study of the following description and appended claims, with reference has to the attached drawings showing some preferred embodiments of my invention.

BRIEF DESCRIPTION OF THE DRAWINGS

FIG. 11 is a partial top plan of another preferred form of drive pin support mechanism according to my invention;

FIG. 12 is a partial top plan of still another preferred form of drive pin support mechanism according to my invention;

DESCRIPTION OF THE PREFERRED EMBODIMENTS

Figure 1:
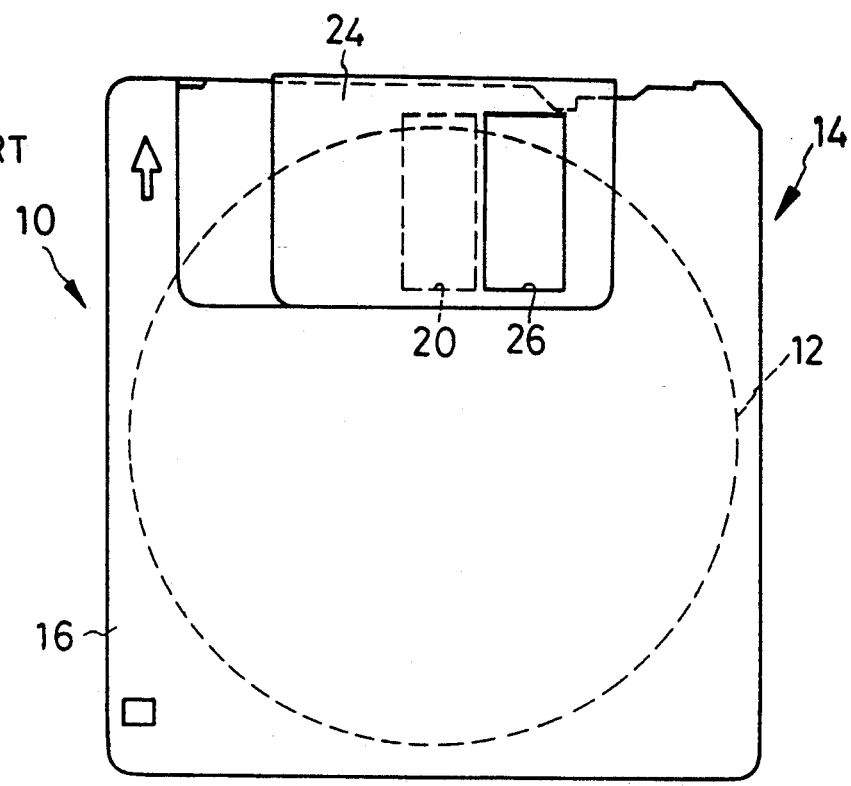
FIG. 1 is a top plan of the known flexible magnetic disk cassette for use with the data storage apparatus of my invention.

I will first briefly describe the flexible magnetic disk cassette of prior art construction for use with the drive pin support mechanism of my invention. Generally designated 10 in FIGS. 1 and 2, the disk cassette has a flexible magnetic disk 12 of three and a half inch diameter rotatably housed in a protective envelope 14 of rigid plastic material. The envelope 14 is of approximately square, rather flat, boxlike shape having a front or top side 16 seen in FIG. 1 and a rear or bottom side 18 seen in FIG. 2.

Formed in both top 16 and bottom 18 sides of the envelope 14, and in the vicinity of one edge thereof, are a pair of apertures 20 and 22 which are in register with each other. These apertures 20 and 22 expose radial portions of the opposite sides of the magnetic disk 12 for data transfer contact with a pair of transducers or read/write heads to be set forth presently.

Normally, the apertures 20 and 22 in the disk envelope 14 are closed by a common sliding shutter 24. This sliding shutter is in the form of a rectangular piece of sheet metal material folded over itself to fit over one edge of the envelope 14. The shutter 24 has itself two apertures 26 and 28 which are out of register with the envelope apertures 20 and 22 when the shutter is held by a spring, not shown, in the normal or right hand position depicted in FIGS. 1 and 2. When the disk cassette 10 is loaded in the associated data storage apparatus or disk drive to be disclosed subsequently, the shutter 24 will be forced to the left against the force of the unshown spring. Thereupon the shutter apertures 26 and 28 will come into register with the envelope apertures 20 and 22 thereby exposing the radial portions of the opposite sides of the disk 12 for data transfer with the data transducers of the data storage apparatus.

The disk cassette 10 is to be placed upon the turntable of the data storage apparatus with the top side 16, FIG. 1, of the disk envelope 14 directed upwardly. Thus, as shown in FIG. 2, the bottom side 18 of the disk envelope 14 has a circular opening 30 cut centrally therein to permit working engagement of the disk 12 with the turntable, as will become apparent from the subsequent description of the data storage apparatus.

Exposed through the opening 30 is a hub 32 in the form of a disk of magnetic sheet metal material attached centrally to the disk 12. The hub 32 has formed therein a central opening 34 of approximately square shape and an eccentric opening 36 of approximately rectangular shape. It will be noted that the eccentric opening or slot 36 is elongated in a direction at an angle to the radial direction of the disk 12. This angular arrangement of the eccentric slot 36 with respect to the square shaped central opening 34 is important for the establishment of the proper working engagement of the disk 12 with the turntable, as will become apparent from the subsequent description of operation.

Figure 2:
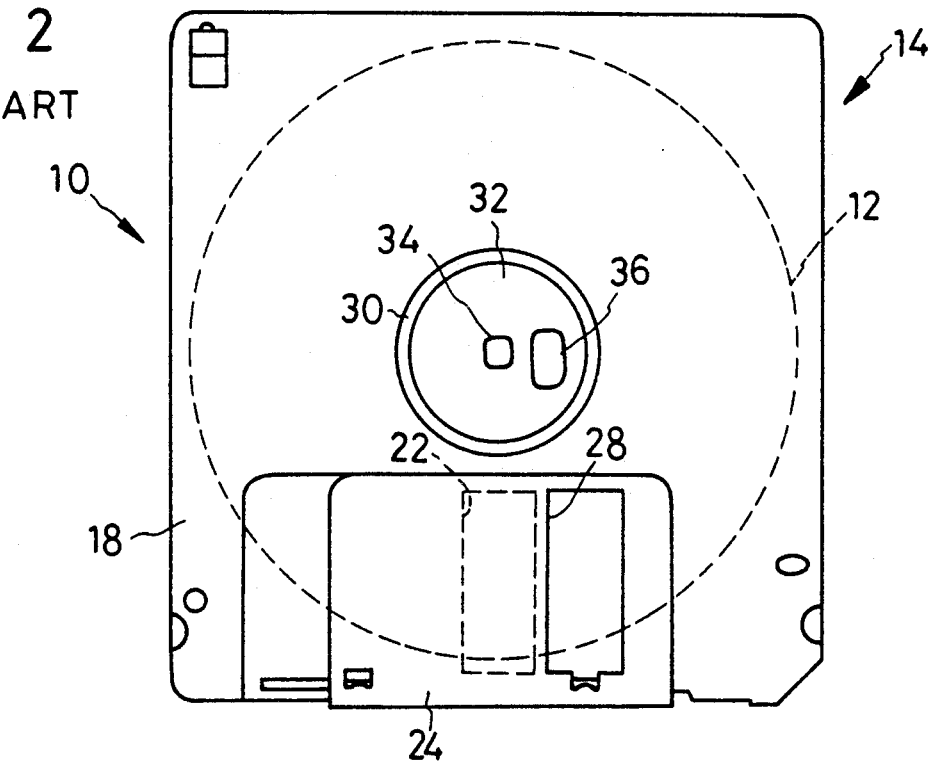
FIG. 2 is a bottom plan of the disk cassette of FIG. 1.
Figure 3:
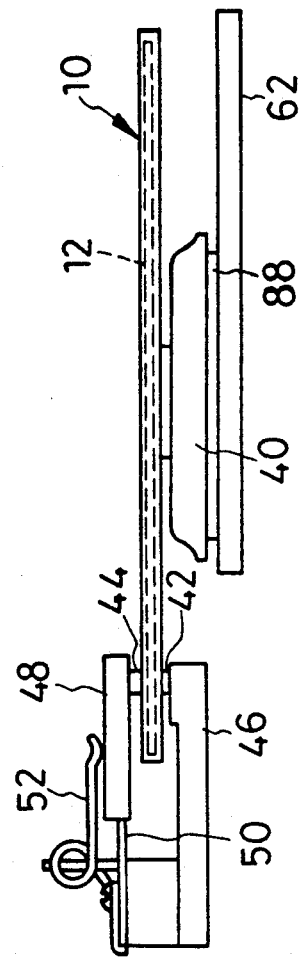
FIG. 3 is a side elevation of some essential parts of the data storage apparatus for use with the disk cassette of FIGS. 1 and 2.

I will now refer to FIG. 3 for an inspection of the data storage apparatus 38 for use with the disk cassette 10 of FIGS. 1 and 2. FIG. 3 shows the disk cassette 10 mounted on the turntable 40, so that I understand that the shutter 24 is open. The apparatus 38 has a pair of data transducers 42 and 44 which are now shown to be in data transfer contact with the exposed radial portions of the opposite sides of the disk 12.

The lower transducer 42, for data transfer with the bottom side of the disk 12, is mounted directly on a carriage 46. The upper transducer 44, on the other hand, is mounted to a support beam 48 which in turn is mounted to the carriage 46 via a cantilever spring 50. This spring coacts with a torsion spring 52 to urge the upper transducer 44 against the lower transducer 42 via the disk 12. I understand that the apparatus 38 is provided with a transducer loading mechanism of any known or suitable construction for moving the upper transducer 44 away from the lower 42 when the disk cassette 10 is loaded on and unloaded from the turntable 40.

I have indicated a transducer positioning mechanism by a block 54 because of its conventional and well known nature. The transducer positioning mechanism 54 is coupled to the carriage 46 for moving the transducers 42 and 44 across the concentric annular data tracks on the opposite major surfaces of the disk 12. Typically, the transducer positioning mechanism may comprise an electric bidirectional stepper motor and a motion translating mechanism such as a lead screw for converting the incremental rotation of the stepper motor into the linear, stepwise travel of the carriage 46.

Figure 4:
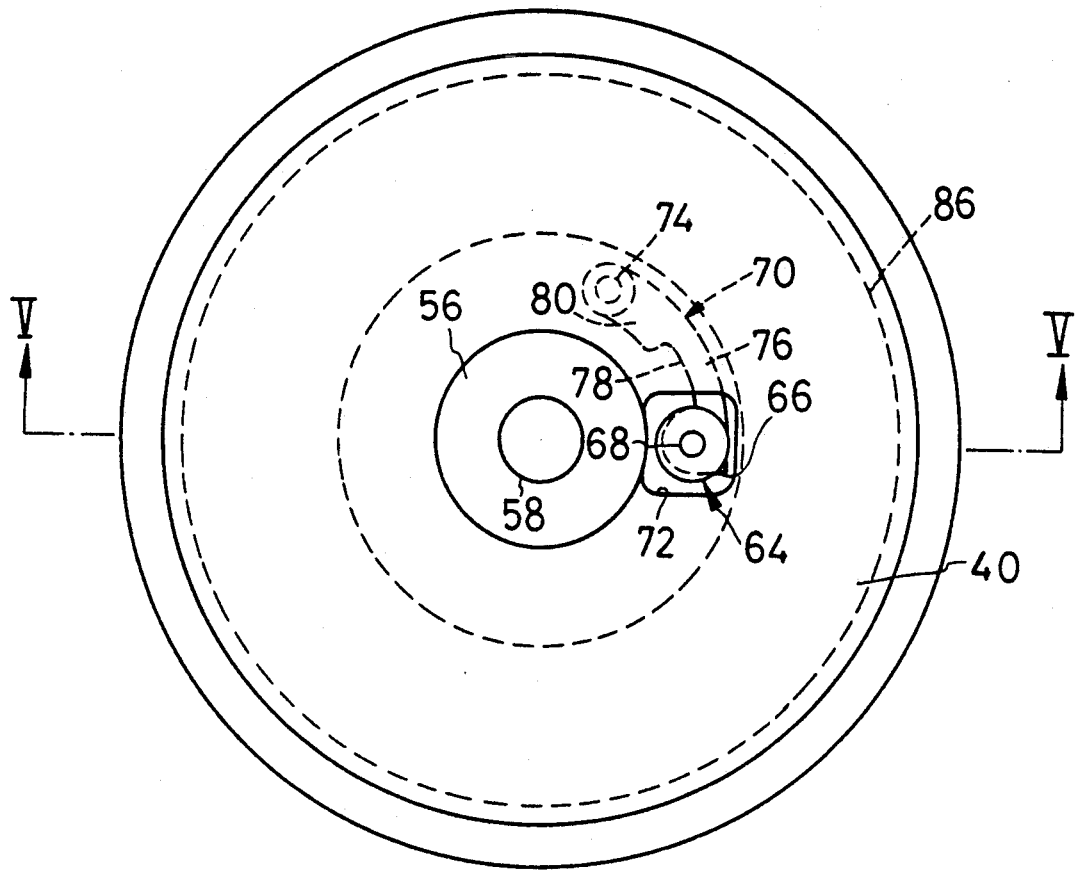
FIG. 4 is an enlarged top plan of the turntable of the data storage apparatus, shown together with the drive pin support mechanism constructed in accordance with my invention.
Figure 5:
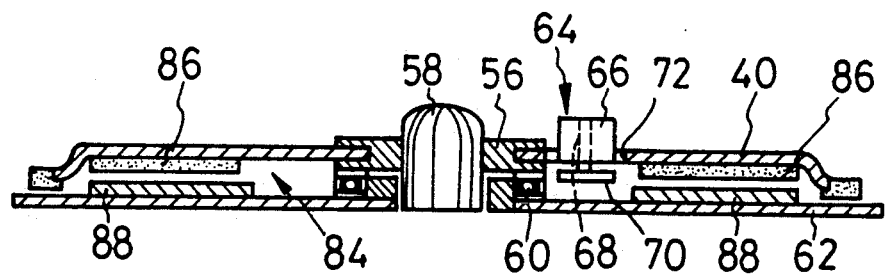
FIG. 5 is an axial section through the turntable, taken along the line V—V in FIG. 4.
Figure 6:
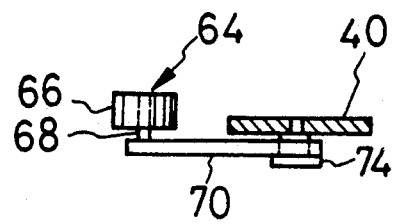
FIG. 6 is a side elevation of the drive pin support mechanism, shown together with part of the turntable which is shown in vertical section.

As illustrated in detail in FIGS. 4 and 5, the turntable 40 has a permanent magnet hub 56 for attracting the sheet metal hub 32, FIG. 2, of the disk 12. Preferably, the turntable hub 56 may be a molding of a magnetic plastic, that is, a plastic molding containing magnetic particles and permanently magnetized. Annular in shape, the turntable hub 56 is pressfitted over an upstanding spindle 58 which is to be loosely engaged in the central opening 34 in the disk hub 32. The turntable 40 is centrally open and has its inner edge embedded in the peripheral edge of the hub 56 for joint rotation therewith. A bearing 60 is provided on a fixed baseplate 62, which may take the form of a printed circuit board in practice, for rotatably supporting the turntable 40 together with the spindle 58.

At 64 in FIGS. 4-7 is seen a drive pin disposed eccentrically on the turntable 40 for driving engagement in the eccentric opening 36, FIG. 2, in the disk hub 32. Preferably, the drive pin 64 takes the form of a roll 66 rotatably mounted on an upstanding shaft 68 for rolling contact with the disk hub edges bounding the eccentric opening or slot 36. Erected on a distal end of a support lever 70 under the turntable 40, the drive pin 64 extends upwardly therefrom through a clearance hole 72 in the turntable 40. The support lever 70 has its proximal end pivoted at 74 to the underside of the turntable 40 for angular displacement in a plane parallel to that of the turntable. The drive pin 64 is therefore movable substantially radially of the turntable 40 with such angular movement of the support lever 70, within the limits set by the clearance hole 72. I suggest that the support lever 70 be made from sheet metal that is resilient only to an extent required for the proper functioning of the support lever to be set forth hereafter.

Figure 7:
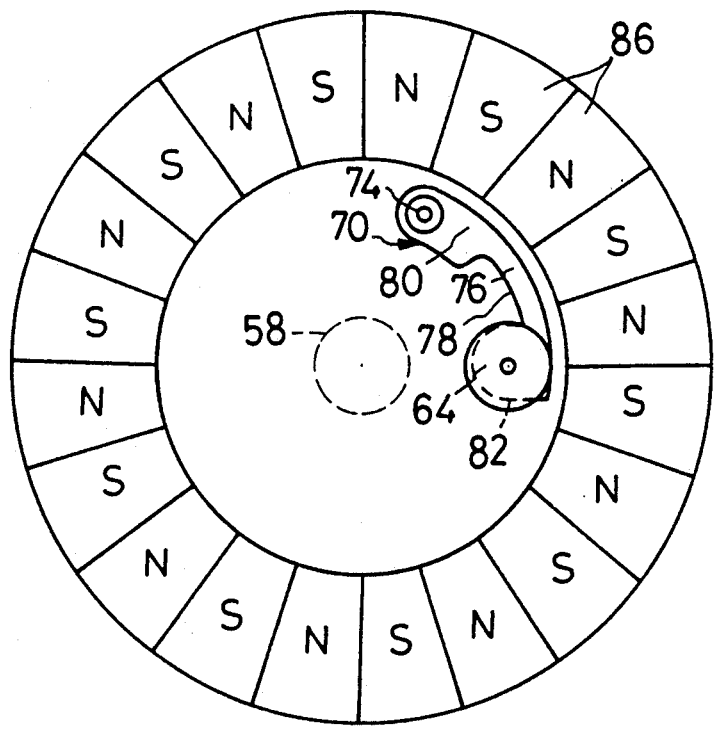
FIG. 7 is a top plan of the permanent magnet rotor of the disk drive motor, shown together with the drive pin support mechanism.

FIGS. 4 and 7 clearly indicate that the support lever 70 is generally arcuate in shape, centered approximately about the axis of the turntable 40, as seen in a plan view as in these figures. This arcuate shape of the support lever 70 is intended for the most efficient transmission of the rotation of the turntable 40 to the magnetic disk 12 via the drive pin 64, in addition to making utmost use of the space available under the turntable.

As shown also in FIGS. 4 and 7, the support lever 70 is formed to include a constricted neck 76 intermediate its ends in accordance with a feature of my invention. In other words, the support lever 70 has a recess 78 in part of its radially inside edge to provide the neck 76. Thus the support lever 70 is formed to include a relatively wide base end portion 80 which is pivoted at 74 to the underside of the turntable 40, a relatively enlarged head portion 82 on which the drive pin 64 is seated, and the neck portion 76 joining the base end portion 80 and the head portion 82. Since the recess 78 is formed as aforesaid in part of the radially inside edge of the arcuate support lever 70, the head portion 82 may be thought of as extending radially inwardly of the turntable 40 from one end of the neck portion 76.

The neck portion 76 of the support lever 70 is intended for torsional elastic deformation so that the drive pin 64 may resiliently tilt radially inwardly of the turntable 40 when the magnetic disk 12 is loaded on the turntable 40, as will be later explained in more detail. The noted resilience of the support lever 70 should be sufficient to permit such torsional deformation of the neck portion 76.

It has been long believed that the drive pin must be resiliently displaceable relative to the turntable in a direction substantially parallel to the turntable axis for proper driving engagement in the eccentric slot in the disk hub when the disk is loaded on the turntable. Recent study has revealed, however, that the drive pin displacement in that direction is not an absolute necessity. Speaking broadly, therefore, the support lever 70 may, or may not, be resilient enough to permit such drive pin movement substantially parallel to the turntable axis.

The torsional elastic deformation of the support lever 70 suggested by my invention makes it undesirable to use a wire spring for biasing the support lever in a counterclockwise direction, as viewed in FIGS. 4 and 7, and hence the drive pin 64 thereon substantially radially outwardly of the turntable 40. I therefore recommend magnetic biasing of the support lever. This can be accomplished by employing magnetic sheet metal material for the support lever and by utilizing the permanent magnet rotor of a known disk drive motor for exerting an attractive force on the support lever, as set forth in detail hereafter.

The reference numeral 84 in FIG. 5 generally denotes the disk drive motor for imparting rotation to the turntable 40 and hence to the magnetic disk 12 loaded thereon. I have shown the disk drive motor 84 as a three phase, eighteen pole, axial gap motor of known construction comprising a permanent magnet rotor 86 and fixed windings 88.

As better illustrated in FIG. 7, the rotor 86 of the disk drive motor 84 is of annular shape, having a series of alternating north and south seeking poles. This annular rotor 86 is affixed to the underside of the turntable 40 in coaxial relationship thereto. Itself made of magnetic material, the turntable 40 serves as a yoke carrying the rotor 86 for joint rotation therewith. The motor windings 88, seen in both FIGS. 3 and 5 are immovably mounted on the printed circuit board 62 and opposed to the rotor 86. I understand that the disk drive motor 84 is conventionally provided with three Hall effect elements, not shown, for its speed control, and with additional windings, also not shown, for sensing its speed.

As will be noted from FIG. 5, the support lever 70 carrying the drive pin 64 is disposed radially inwardly, and below the plane, of the permanent magnet rotor 86 of the disk drive motor 84. Further, since the support lever is of magnetic material as aforesaid, the permanent magnet rotor 86 exerts an attractive force on the support lever 70, biasing the drive pin 64 thereon both substantially radially outwardly of the turntable 40 and upwardly. The radially outward biasing of the drive pin 64 is essential, and the upward biasing thereof optional.

Thus, in this particular embodiment of my invention, I have utilized the permanent magnet rotor 86 of the disk drive motor 84 for biasing the drive pin 64 substantially radially outwardly of the turntable, instead of the conventional wire spring. Such magnetic biasing of the drive pin is described and claimed in my separate application filed substantially concurrently herewith under the title of "Disk Drive Pin Support Mechanism in a Rotating Disk Data Storage Apparatus."

OPERATION

Normally, in data storage apparatus of this type, the turntable is held out of rotation until the loading of the flexible magnetic disk cassette 10 is completed. The spindle 58 will enter the central opening 34 in the disk hub 32 when the flexible magnetic disk cassette 10 is loaded in the apparatus 38 and the disk 12 placed concentrically on the turntable 40. In all likelihood, however, the eccentric drive pin 64 on the turntable 40 will initially be out of register with the eccentric slot 36 in the disk hub 32. The drive pin 64 will then be depressed into the clearance hole 72 in the turntable 40, to an extent depending upon the resiliency of the support lever 70, as well as upon the attractive force of the permanent magnet rotor 86 being exerted upon the support lever, as the permanent magnet hub 56 of the turntable attracts the sheet metal hub 32 of the disk 14.

Figure 9:
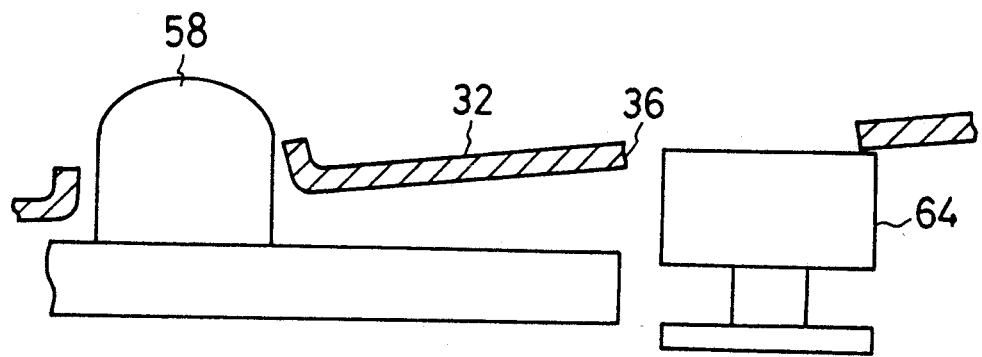
FIG. 9 is a fragmentary side elevation, partly in section, explanatory of the behavior of the prior art drive pin support mechanism when the data storage disk is loaded on the turntable.

As the turntable 40 is subsequently set into rotation by the disk drive motor 84, the drive pin 64 will slide under the disk hub 32 and, before one complete revolution of the turntable, come into register with the eccentric slot 36 in the disk hub. However, should the drive pin 64 be rigidly supported against tilting radially inwardly of the turntable 40, as with the spring biased lever approach disclosed in Japanese Unexamined Utility Model Publication No. 62-106347, supra, then the radially outer edge of the eccentric slot 36 might ride on the drive pin 64, as illustrated in FIG. 9. The drive pin 64 would then fail to enter the slot 36 in the disk hub 32.

Figure 10:
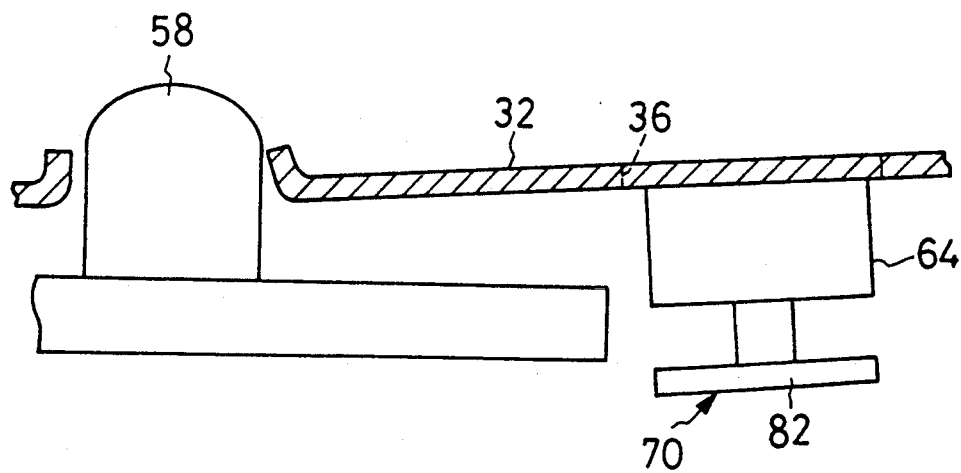
FIG. 10 is a view similar to FIG. 9 but explanatory of the behavior of the drive pin support mechanism according to my invention when the data storage disk is loaded on the turntable.

I have succeeded in defeating this drawback of the prior art lever approach by forming the support lever 70 to include the constricted neck 76. This neck of the support lever will undergo torsional elastic deformation when the disk 12 is placed upon the turntable 40, permitting the drive pin 64 to tilt radially inwardly of the turntable, as illustrated in FIG. 10. So tilted, the drive pin 64 will extend normal to the disk hub 32 while revolving with the turntable 40 in sliding contact with the disk hub. The drive pin will smoothly enter the eccentric slot 36 on subsequently coming into register therewith.

Figure 8:
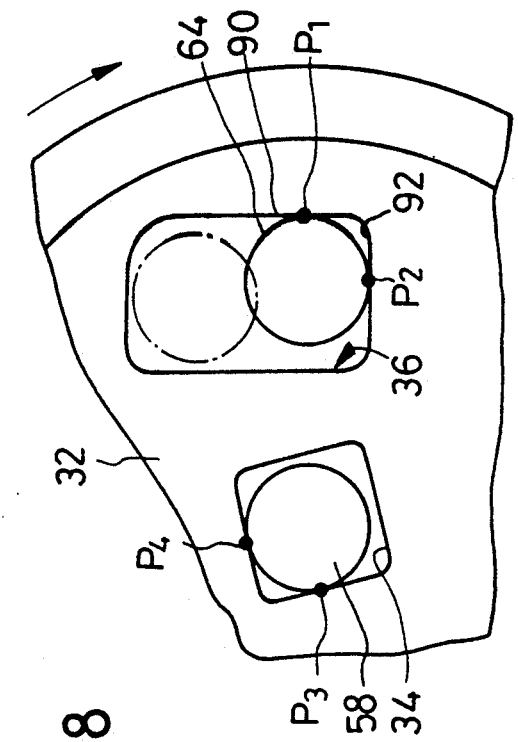
FIG. 8 is an enlarged, fragmentary top plan explanatory of the positions of the drive pin and the spindle in the eccentric and central openings in the magnetic disk during the rotation of the turntable with the disk.

When thus admitted into the eccentric slot 36, the drive pin 64 will initially occupy the position indicated by the phantom outline in FIG. 8. This initial position of the drive pin 64 is at or adjacent the upstream end of the eccentric slot 36 with respect to the arrow marked direction of rotation of the turntable 40.

As has been mentioned with reference to FIG. 2, the eccentric slot 36 extends at an angle, rather than right angles, to a line connecting the axis of the disk hub 32 with the geometrical center of the slot. That angle is such that the radially outer edge 90 bounding the slot 36 draws nearer the center of the disk hub 32 as it extends in the direction of rotation of the turntable 40. It should be noted that FIG. 8 is a top plan of the disk hub 32 whereas FIG. 2 is a bottom plan.

Consequently, the distance between the center of the disk hub 32 and the point of contact between drive pin 64 and disk hub edge 90 decreases to a minimum when the drive pin arrives at the solid line position of FIG. 8. The support lever 70 carrying the drive pin 64 will turn in a clockwise direction, as viewed in FIG. 4 and 7, about its pivot 74 relative to the turntable 40 in order to make possible such displacement of the drive pin substantially radially inwardly of the turntable. The drive pin 64 when in the solid line position of FIG. 8 contacts not only the radially outer edge 90 of the eccentric slot 36 at a point $P_1$ but also its downstream edge 92 at a point $P_2$.

The solid line position of the drive pin 64 is what I call its final drive position. The drive pin 64 when in this final drive position is in proper driving engagement with the slot 36, imparting the rotation of the turntable 40 to the disk 12. The spindle 58, on the other hand, will contact at points $P_3$ and $P_4$ the generally square disk hub edges defining the central hole 34 when the drive pin 64 is in the final drive position.

Before arriving at the final drive position, the drive pin 64 will come into contact with the edge 90 of the eccentric slot 36 at some point upstream of the point $P_1$ as the drive pin revolves clockwise, as viewed in FIG. 8, with the turntable 40 after entering the slot 36 in the phantom position. With the continued rotation of the turntable 40 relative to the disk hub 32, the drive pin 64 will roll over the edge 90 of the slot 36 thereby to be gradually forced substantially radially inwardly of the turntable in opposition to the substantially radially outward force being exerted by the permanent magnet rotor 86 of the disk drive motor 78 upon the sheet metal support lever 70.

Therefore, in the final drive position, the drive pin 64 will be magnetically maintained in firm contact with the eccentric slot edges at the points $P_1$ and $P_2$, and the spindle 58 in firm contact with the central hole edges at the points $P_3$ and $P_4$. There will be no looseness whatever between disk hub 32 and turntable 40.

Incidentally, in the aforementioned Sakaguchi patent, the drive pin was also tiltable radially inwardly of the turntable by virtue of the resiliency of the cantilevered support spring. This spring was, however, not itself pivotable in a plane parallel to that of the turntable. The drive pin on the support spring had therefore to be tiltable through a large angle for proper driving engagement with the eccentric slot in the disk hub.

Contrastingly, according to my present invention, the drive pin 64 on the pivoted support lever 70 needs to tilt only into right angular relation to the disk 12 resting slantingly on the turntable before the drive pin becomes received in the eccentric slot therein, as pictured in FIG. 10. The angle of this tilting motion is far less than that through which the drive pin on the prior art cantilevered support spring had to be tilted for driving engagement in the disk slot. The support lever 70 with the constricted neck 76 according to my invention can thus be of much sturdier make, and is, moreover, far simpler in shape and smaller in size, than the conventional support spring.

SECOND FORM

FIG. 11 shows a modified drive pin support lever 70a for use with the data storage apparatus 38 of FIG. 1 in substitution for the support lever 70. Fabricated from resilient, magnetic sheet metal material, the modified support lever 70a has a base portion 80a of circular shape pivoted at 74a to the underside of the turntable 40, a head portion 82a of circular shape carrying the drive pin 64, and an elongate neck portion 76a joining the base portion and the head portion. Generally, like the first disclosed support lever 70, the modified support lever 70a extends circumferentially of the turntable 40.

The neck portion 76a of the support lever 70a is formed by creating a recess 78a along the radially inside edge of the support lever to enable the drive pin 64 to tilt radially inwardly of the turntable 40 with the torsional deflection of the neck portion. It will also be noted that the neck portion 76a of this modified support lever 70a is longer than the neck portion 78, FIG. 7, of the support lever 70 and is generally V shaped as seen in a plan view as in FIG. 11. The drive pin 64 on the head portion 82a is therefore easier of tilting in the required direction.

This alternate embodiment also features the arrangement of the support lever 70a on the turntable 40. Normally, the position of the pivot 74a of the support lever 70a on the turntable 40 is on a line $L_1$ that passes through the axis (or geometrical center as seen in a plan view as in FIG. 11) of the drive pin 64 and that extends at right angles with another line $L_2$ extending through the drive pin axis and the axis of the turntable 40.

There are many manufactures of the flexible magnetic disk cassette 10. The positions of the eccentric slots 36 in the disks made by different manufacturers are not exactly alike. The above arrangement of the support lever 70a on the turntable 40 is effective to hold the disk 12 in practically the same angular position on the turntable in the face of possible variations in the position of the eccentric slot 36. The holding of the disk in the same angular position on the turntable is important for eliminating the so called index timing error between the index mark, not shown, on the disk drive mechanism and the angular position of the transducers 42 and 44 on the disk.

THIRD FORM

FIG. 12 shows another modified drive pin support lever 70b for use with the data storage apparatus 38 of FIG. 1 in substitution for the support lever 70. The second modified support lever 70b is formed from resilient, magnetic sheet metal to include a base portion 80b of circular shape pivoted at 74b to the underside of the turntable 40, a head portion 82b of circular shape carrying the drive pin 64, and a cranked neck portion 76b joining the base portion and the head portion. The second modified support lever 70b also generally extends circumferentially of the turntable 40.

One of the constituent arms of the neck portion 76b, which is joined directly to the base portion 80b, is formed by creating a recess 78b along the radially inside edge of the support lever 70b to enable the drive pin 64 to tilt radially inwardly of the turntable 40 with the torsional deflection of the neck portion. It will also be appreciated that the cranked neck portion 76b serves to magnify the tilting angle of the drive pin 64 for a given angle of torsional deflection of the neck portion.

FOURTH FORM

Figure 13:
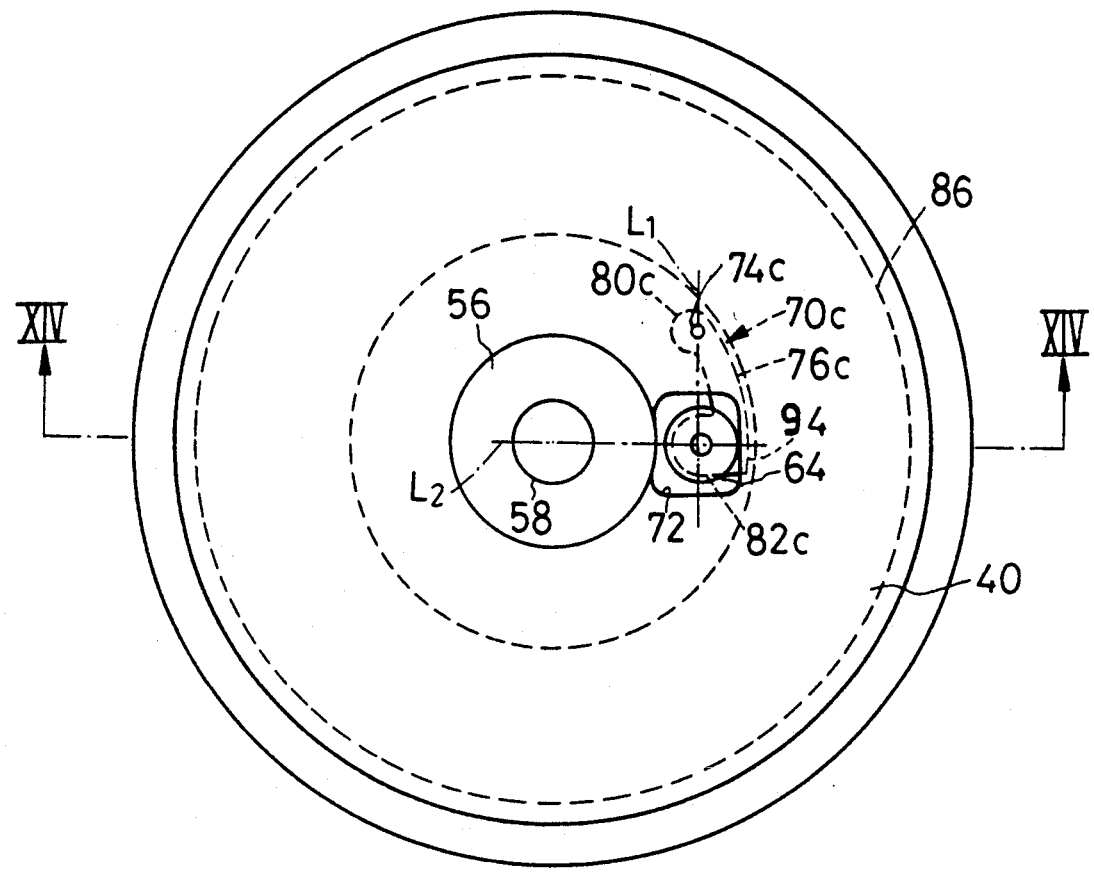
FIG. 13 is a view similar to FIG. 4 but showing yet another preferred form of drive pin support mechanism according to my invention.
Figure 14:
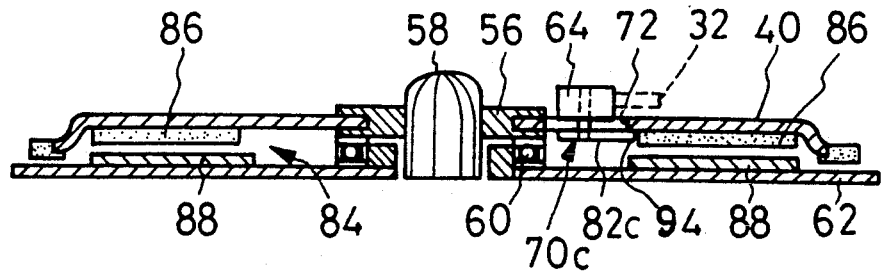
FIG. 14 is a section taken along the line XIV—XIV in FIG. 13.

FIGS. 13 and 14 are views similar to FIGS. 4 and 5, respectively, but showing still another modified drive pin support lever 70c, also for use with the data storage apparatus 38 of FIG. 1 in substitution for the support lever 70. The third modified support lever 70c is formed from resilient, magnetic sheet metal to include a base portion 80c of circular shape pivoted at 74c to the underside of the turntable 40, a head portion 82c of circular shape carrying the drive pin 64, an elongate neck portion 76c of arcuate shape joining the base portion and the head portion, and an expansion 94 extending from the head portion 82c in a radially outward direction of the turntable 40.

Generally, the third modified support lever 70c also extends circumferentially of the turntable 40. Also, as in the FIG. 11 embodiment, the position of the pivot 74c of the support lever 70c on the turntable 40 is on a line $L_1$ that passes through the axis of the drive pin 64 and that extends at right angles with another line $L_2$ extending through the drive pin axis and the axis of the turntable 40 when the support lever is in the normal position.

As will be noted from FIG. 14, the support lever 70c makes sliding contact with the underside of the turntable 40, in contrast to, for example, the support lever 70 which, as shown in FIG. 5, makes no direct contact with the turntable. The expansion 94 of the head portion 82c of the support lever 70c remains in sliding contact with the underside of the turntable 40 in any angular position of the support lever relative to the turntable.

When the drive pin 64 is in the final drive position in the eccentric slot 36 in the disk hub 32, as indicated by the solid line in FIG. 8, the support lever 70c is urged radially outwardly of the turntable 40 as the permanent magnet rotor 40 of the disk drive motor 84 exerts an attractive force on the support lever. Consequently, should the support lever 70c be too resilient, and were it not for the expansion 94, the drive pin 64 would tilt radially inwardly of the turntable 40 due to the torsional deflection of the neck portion 76c of the support lever. Held against the underside of the turntable 40, the expansion 94 of the support lever head portion 82c serves to prevent or minimize such undesired tilting of the drive pin 64 in its final drive position in the eccentric slot 36 in the disk hub 32.

The tilting of the drive pin through variable angles in the final drive position is objectionable because it would give rise to index timing errors from one data storage apparatus to another or from one run of data transfer operation to another. Also, the disk might suffer instantaneous speed variations if the drive pin were too susceptible to tilting. These inconveniences can be overcome by forming the support lever 70c to include the expansion 94 constantly held against the underside of the turntable 40.

POSSIBLE MODIFICATIONS

Although I have shown and described my invention in terms of some one preferred embodiments thereof, I recognize, of course, that my invention could be embodied in other forms within the broad teaching hereof. The following, then, is a brief list of possible modifications or alterations of the illustrated embodiment which I believe all fall within the scope of my invention:

1. The drive pin support lever could be of other than the illustrated shapes, all that is required by my invention being that it be capable of torsional deflection to permit the drive pin to tilt radially inwardly of the turntable.

2. The drive pin could be biased radially outwardly of the turntable by other than the illustrated magnetic means.

3. The drive pin could be magnetically biased not only radially outwardly, but also upwardly, with respect to the turntable.

4. The drive pin 64 could be biased by a devoted permanent magnet, rather than by the permanent magnet rotor of the disk drive motor.

5. Instead of making the drive pin support lever from magnetic material, a separate magnetic member could be mounted to the lever, so as to be acted upon by the permanent magnet rotor of the disk drive motor or by equivalent means.

6. The rotation of the drive pin about its own axis is not an absolute requirement, so that it could be nonrotatably mounted on the support lever.

What I claim is:

1. A rotating disk data storage apparatus having a turntable for supporting a data storage disk for joint rotation therewith, a spindle disposed centrally on the turntable for centering engagement in a first opening formed centrally in the disk, and a drive pin extending through an eccentric clearance hole in the turntable for driving engagement in a second opening formed eccentrically on the turntable resting disk when first loaded concentrically on the turntable resting slantingly thereon as the drive pin butts endwise against the data storage disk until the drive pin becomes engaged in the second opening in the disk with the rotation of the turntable, wherein the improvement resides in a drive pin support mechanism comprising:

(a) a support lever of resilient material carrying the drive pin on one end and coupled at another end to the turntable via a pivot for pivotal movement relative to the turntable so that the drive pin is movable substantially radially of the turntable within limits set by the clearance hole in the turntable, the support lever generally extending circumferentially of the turntable for imparting the rotation on the turntable to the drive pin and thence to the data storage disk on the turntable, the position of the pivot of the support lever on the turntable being approximately on a first line which extends through the geometrical center of the drive pin as seen in a direction parallel to the axis of rotation of the turntable, said first line forming a right angle with a second line which extends through the geometrical center of the drive pin and the axis of the turntable when the support lever is in a normal position on the turntable; and (b) resilient means for biasing the drive pin substantially radially outwardly of the turntable in order that the data storage disk may be engaged without looseness by the spindle and the drive pin on the turntable.

2. The rotating disk data storage apparatus of claim 1 wherein the support lever includes a constricted neck portion between the opposite ends thereof, the neck portion being capable of torsional deflection to permit the drive pin to tilt radially inwardly of the turntable at a right angle with the data storage disk which rests slantingly on the turntable, whereby the drive pin is smoothly admitted into the second opening in the disk upon rotation of the turntable.

3. The rotating disk data storage apparatus of claim 2 wherein the neck portion of the support lever has a continuously smooth curve as seen in a direction parallel to an axis of rotation of the turntable.

4. The rotating disk data storage apparatus of claim 2 wherein the neck portion of the support lever further comprises two straight arms which are joined to form a predetermined angle as seen in a direction parallel to an axis of rotation of the turntable.

5. The rotating disk data storage apparatus of claim 4 wherein said predetermined angle is a right angle.

6. The rotating disk data storage apparatus of claim 2 wherein the support lever is held against the turntable for pivotal movement in sliding contact therewith, and wherein the support lever is formed to include a portion that is held against the turntable for limiting the tilting of the drive pin radially inwardly of the turntable after the drive pin has been engaged in the second opening in the data storage disk.

7. The rotating disk data storage apparatus of claim 1 wherein the support lever is of magnetic material, and wherein the resilient means comprises permanent magnet means for exerting an attractive force on the support lever.

8. A rotating disk data storage apparatus having a turntable for supporting a data storage disk for joint rotation therewith in a predetermined direction about an axis of the turntable, a spindle disposed centrally on the turntable for centering engagement in a first opening formed centrally in the disk, a drive pin extending through an eccentric clearance hole in the turntable for driving engagement in a second opening formed eccentrically in the disk, the second opening being in the shape of a slot generally extending at an angle to a line joining the axis of the turntable and a geometrical center of the slot, the slot having a first edge which is disposed radially outwardly of the turntable and which draws nearer the axis of the turntable as the first edge extends in the predetermined direction of rotation of the turntable, and a second edge joined to the first edge at a downstream end of the first edge with respect to the predetermined direction of rotation of the turntable, and a disk drive motor having a permanent magnet rotor of annular shape mounted concentrically to the turntable, the data storage disk when first loaded concentrically on the turntable resting slantingly thereon as the drive pin butts endwise against the data storage disk, until the drive pin becomes engaged in the second opening in the disk with the rotation of the turntable, wherein the improvement resides in a drive pin support mechanism comprising:

(a) a support lever of resilient and magnetic sheet metal carrying the drive pin on one end and coupled at another end to the turntable for pivotal movement relative to the turntable so that the drive pin is movable substantially radially of the turntable within limits set by the clearance hole in the turntable, the support lever generally extending circumferentially of the turntable for imparting the rotation of the turntable to the drive pin and thence to the data storage disk on the turntable, the support lever being formed to include a constricted neck portion intermediate the opposite ends thereof, the neck portion being capable of torsional deflection to permit the drive pin to tilt radially inwardly of the turntable into right angular relationship with the data storage disk resting slantingly on the turntable, whereby the drive pin is smoothly admitted into the second opening in the disk upon rotation of the turntable;

(b) the support lever being disposed radially inwardly of the permanent magnet rotor of the disk drive motor whereby the permanent magnet rotor exerts an attractive force on the support lever for biasing the drive pin substantially radially outwardly of the turntable in order to maintain the drive pin in firm driving engagement with the first and the second edge of the second opening in the disk during the rotation of the turntable.

9. The rotating disk data storage apparatus of claim 8 wherein the support lever is sufficiently resilient to permit the drive pin to travel in a direction substantially parallel to the axis of the turntable, and wherein the relative placement of the support lever and the permanent magnet rotor is such that the drive pin is additionally magnetically biased toward the disk on the turntable in order that the drive pin may be smoothly engaged in the second opening in the disk.

* * * * *